(12) United States Patent
Masko et al.

(10) Patent No.: US 11,308,321 B2
(45) Date of Patent: Apr. 19, 2022

(54) METHOD AND SYSTEM FOR 3D CORNEA POSITION ESTIMATION

(71) Applicant: Tobii AB, Danderyd (SE)

(72) Inventors: David Masko, Danderyd (SE); Magnus Ivarsson, Danderyd (SE); Niklas Ollesson, Danderyd (SE); Anna Redz, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/915,233

(22) Filed: Jun. 29, 2020

(65) Prior Publication Data

US 2021/0012105 A1 Jan. 14, 2021

(30) Foreign Application Priority Data

Jun. 28, 2019 (SE) .................................... 1950825-8

(51) Int. Cl.
*G06K 9/00* (2006.01)
*G06T 7/70* (2017.01)
*G06K 9/52* (2006.01)
*G06T 7/277* (2017.01)

(52) U.S. Cl.
CPC ..... *G06K 9/00604* (2013.01); *G06K 9/00201* (2013.01); *G06K 9/52* (2013.01); *G06T 7/277* (2017.01); *G06T 7/70* (2017.01); *G06T 2200/04* (2013.01)

(58) Field of Classification Search
CPC .... G06K 9/00201; G06K 9/52; G06K 9/0061; G06K 9/00604; G06T 7/277; G06T 7/73; G06T 7/70; G06T 2200/04; G06T 2207/30041; G02B 27/0093; G02B 27/0172; G02B 2027/0187
See application file for complete search history.

(56) References Cited

U.S. PATENT DOCUMENTS

2019/0042842 A1* 2/2019 Cavin ....................... G06T 7/74

OTHER PUBLICATIONS

Park, Kang Ryoung. "Robust gaze estimation for human computer interaction." Pacific Rim International Conference on Artificial Intelligence. Springer, Berlin, Heidelberg, 2006. (Year: 2006).*
Park, Kang Ryoung, Jeong Jun Lee, and Jaihie Kim. "Facial and eye gaze detection." International Workshop on Biologically Motivated Computer Vision. Springer, Berlin, Heidelberg, 2002. (Year: 2002).*
Ko, You Jin, Eui Chul Lee, and Kang Ryoung Park. "A robust gaze detection method by compensating for facial movements based on corneal specularities." Pattern Recognition Letters 29.10 (2008): 1474-1485. (Year: 2008).*

* cited by examiner

*Primary Examiner* — Vu Le
*Assistant Examiner* — Tracy Mangialaschi
(74) *Attorney, Agent, or Firm* — Samuel I. Yamron

(57) ABSTRACT

There is provided a method, system, and non-transitory computer-readable storage medium for performing three-dimensional, 3D, position estimation for the cornea center of an eye of a user, using a remote eye tracking system, wherein the position estimation is reliable and robust also when the cornea center moves over time in relation to an imaging device associated with the eye tracking system. This is accomplished by generating, using, and optionally also updating, a cornea movement filter, CMF, in the cornea center position estimation.

16 Claims, 5 Drawing Sheets

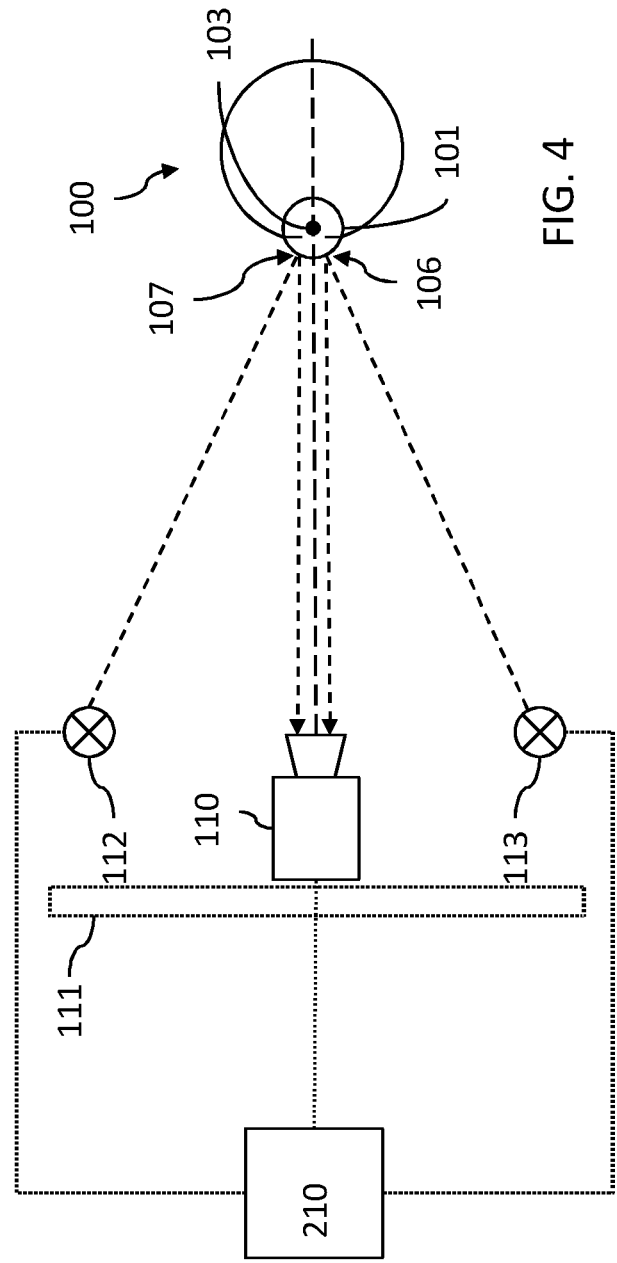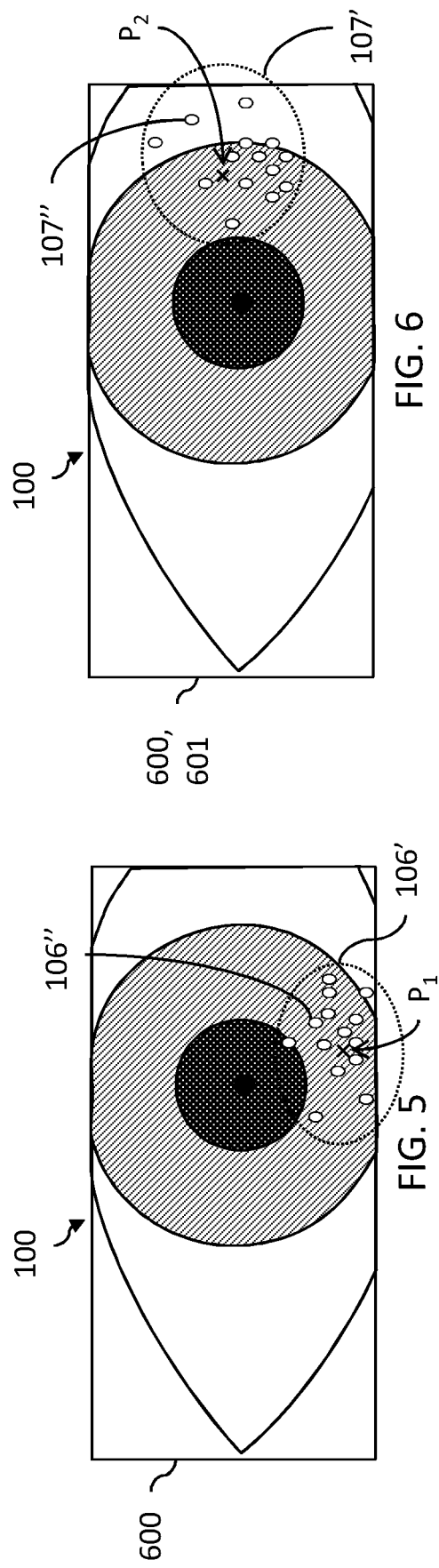
FIG. 4
FIG. 6
FIG. 5

METHOD AND SYSTEM FOR 3D CORNEA POSITION ESTIMATION

CROSS REFERENCE TO RELATED APPLICATIONS

This application claims priority to Swedish Application No. 1950825-8 filed Jun. 28, 2019; the content of which are hereby incorporated by reference.

TECHNICAL FIELD

The present disclosure generally relates to the field of eye tracking. In particular, the present disclosure relates to estimating a three-dimensional (3D) position of the cornea of an eye of a user, to optimize eye tracking accuracy.

BACKGROUND

Several different eye tracking systems are known in the art. Such systems may for example be employed to allow a user to indicate a location at a computer display by looking at that point. Generally, an eye tracking system is used to detect the person's gaze.

Typically, the eye tracking system may capture images of the user's face using a set of cameras, and then employ image processing to extract key features from the user's face, such as a pupil center and glints from illuminators illuminating the user's face. The extracted features may then be employed to determine where at the display the user is looking. Naturally, factors such as accuracy, speed, and reliability/robustness of the eye tracking are desirable to achieve a positive user experience. Therefore, several schemes have been proposed for mitigating the negative effects of different types of errors or inaccuracies that may occur in eye tracking systems.

One commonly used technique for eye tracking is pupil center corneal reflection (PCCR). In order for this technique to provide reliable results, the position of where the cornea is located needs to be determined quite accurate. Such cornea position estimation is known, but a disadvantage of existing cornea position estimation solutions is that they perform unsatisfactorily when the eye, and specifically the cornea, is moving.

One specific problem with regard to cornea position estimation that arise when the cornea is moving is that a lot of noise is introduced in the measurements of the distance to the cornea, rendering very noisy gaze information or very inaccurate gaze information when a user of the eye tracking system moves his/her gaze with regard to the screen over time.

In order to be able to perform eye tracking, the pupil of a user eye, and at least one glint, must be identified in an image captured by a camera associated with the eye tracking system. Many remote eye trackers use two kinds of images for pupil detection: bright pupil (BP) images and dark pupil (DP) images. A BP image is captured with active illumination on the camera axis, which results in light reflecting off the user's retina and back to the camera, resulting in a bright pupil (BP effect) in the captured image. In both BP and DP images, the active illumination is needed to generate the at least one glint in the resulting image. In the images, false glints may also be present, caused by reflection of other light sources than the active illuminators. A further specific problem of existing solutions, related to cornea position estimation, is that it is hard to identify any false glints in the captured images, because accurate false glint detection requires an accurate estimate of the cornea position.

As a consequence, cornea position estimation is inaccurate and un-reliable in situations where the eye of the subject, or user of the eye tracking system, is not stationary over time.

It would be desirable to provide further systems and methods addressing at least one of the issues described above.

SUMMARY

An object of the present disclosure is to address at least one of the issues described above.

According to a first aspect, the objects are achieved by a method for performing three-dimensional, 3D, position estimation for the cornea center of an eye of a user, using a remote eye tracking system, when the cornea center moves over time in relation to an imaging device associated with the eye tracking system. The method comprises generating, using processing circuitry associated with the eye tracking system, a cornea movement filter, CMF, comprising an estimated initial 3D position and an estimated initial 3D velocity of the cornea center of the eye at a first time instance and predicting, using the processing circuitry a first two-dimensional, 2D, glint position in an image captured at a second time instance by applying the cornea movement filter, CMF, wherein the predicted first glint position represents a position where a first glint is predicted to be generated by a first illuminator associated with the eye tracking system and a second 2D glint position in an image captured at the second time instance by applying the cornea movement filter, CMF, wherein the predicted second glint position represents a position where a glint is predicted to be generated by a second illuminator associated with the eye tracking system. The method further comprises performing image processing, using the processing circuitry, including the steps of: identifying at least one first candidate glint in a first image captured by the imaging device at the second time instance wherein the first image comprises at least part of the cornea of the eye and at least one glint generated by the first illuminator; and identifying at least one second candidate glint in the first image or in a second image captured by the imaging device at a third time instance and comprising at least part of the cornea of the eye and at least one glint generated by the second illuminator. Suitably, the method further comprises selecting, using the processing circuitry, a pair of a first and second candidate glint, out of all possible pairs of a first candidate glint and a second candidate glint, that has the highest probability of corresponding to the predicted first and second glint positions, based on a probability estimation function; estimating the current 3D position of the cornea, using the processing circuitry, based on the positions of the selected pair of first and second candidate glints; and updating the cornea movement filter, CMF, using the processing circuitry, by setting the estimated initial 3D position, of the cornea center to the current 3D position of the cornea center.

Thereby, advantageously, improved 3D cornea position estimation with regard to accuracy and reliability is achieved.

The method may be iterated, i.e. performed repeatedly, to continuously improve the 3D cornea position estimation, with regard to accuracy and reliability, especially in cases where the cornea is not stationary in relation to an imaging device of the eye tracking system over time.

In one or more embodiment, the method further comprises performing eye tracking, employing the improved 3D cornea position estimation according to any of the embodiments presented herein, thereby achieving improved eye tracking performance.

According to a second aspect, the objects are achieved by an eye tracking system, the system comprising processing circuitry configured to: generate a cornea movement filter, CMF, comprising an estimated initial 3D position and an estimated initial 3D velocity of the cornea center of the eye at a first time instance; predict a first two-dimensional, 2D, glint position in an image captured at a second time instance by applying the cornea movement filter, CMF, wherein the predicted first glint position represents a position where a first glint is predicted to be generated by a first illuminator associated with the eye tracking system; predict a second 2D glint position in an image captured at the second time instance by applying the cornea movement filter, CMF, wherein the predicted second glint position represents a position where a glint is predicted to be generated by a second illuminator associated with the eye tracking system; perform image processing to: identify at least one first candidate glint in a first image captured by the imaging device at the second time instance, wherein the first image comprises at least part of the cornea of the eye and at least one glint generated by the first illuminator; identify at least one second candidate glint in the first image or in a second image captured by the imaging device at a third time instance and comprising at least part of the cornea of the eye and at least one glint generated by the second illuminator; select a pair of a first and second candidate glint, out of all possible pairs of a first candidate glint and a second candidate glint, that has the highest probability of corresponding to the predicted first and second glint positions, based on a probability estimation function; estimate the current 3D position of the cornea based on the positions of the selected pair of first and second candidate glints; and update the cornea movement filter, CMF, by setting the estimated initial 3D position of the cornea center to the current 3D position of the cornea center.

The processing circuitry may be configured to perform these actions repeatedly.

The system may further be configured to perform eye tracking.

According to a third aspect, the objects are achieved by a non-transitory computer-readable storage medium storing instructions which, when executed by processing circuitry of a system, cause the system to perform the method of the appended claim 1.

The non-transitory computer-readable storage medium may further store instructions which, when executed by processing circuitry of a system, cause the system perform these method steps repeatedly.

The non-transitory computer-readable storage medium may further store instructions which, when executed by processing circuitry of a system, cause the system to perform the method steps of any of the appended method claims.

Many alternative embodiments of the method, system, and non-transitory computer-readable storage medium are apparent from the detailed description and figures, and from the appended claims.

The effects and/or advantages presented in the present disclosure for embodiments of the method according to the first aspect may also apply to corresponding embodiments of the non-transitory computer-readable storage medium according to the third aspect.

It is noted that embodiments of the present disclosure relate to all possible combinations of features recited in the claims.

BRIEF DESCRIPTION OF THE DRAWINGS

In the following, example embodiments will be described in greater detail with reference to the accompanying drawings, in which:

FIG. 4 shows a schematic overview of an eye of a user and components of an eye tracking system, according to one or more embodiments;

FIG. 5 is an illustration of an eye image, comprising a plurality of candidate glints, captured using a camera of an eye tracking system;

FIG. 6 is an illustration of an eye image, comprising a plurality of candidate glints, captured using a camera of an eye tracking system;

Figure 1:
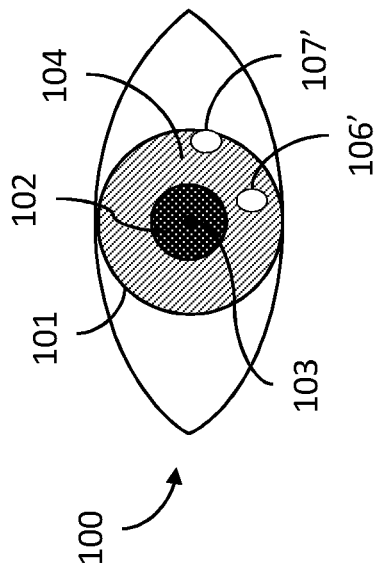
FIG. 1 is a front view of an eye.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Introduction

Aspects of the present disclosure will be described more fully hereinafter with reference to the accompanying drawings. The devices and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Embodiments of the present disclosure aim at solving the ensuing problem that prior three-dimensional (3D) cornea position estimation solutions do not perform satisfactorily when the cornea is moving over time with regard to components of the eye tracking system. To solve this problem, there are presented systems, methods and computer program products for estimating a 3D position of a cornea or a user eye, comprising generating and using a cornea movement filter, CMF. The solution according to some embodiments comprises continuously updating the CMF filter by feeding the most recent information on estimated 3D cornea position and velocity back into the CMF. Thereby, the CMF information is continuously updated or refined and hence the resulting 3D cornea position estimation is continuously improved. Details of the embodiments are presented in connection with the figures.

Embodiments of the present disclosure further aim at solving, or at least ameliorating, the specific problem with regard to cornea position estimation that arise when the cornea is moving is that a lot of noise in introduced in the measurements of the distance to the cornea, rendering very noisy gaze information or very inaccurate gaze information when a user of the eye tracking system moves his/her gaze with regard to the screen over time.

Furthermore, embodiments of the present disclosure aim at solving, or at least ameliorating, the specific problem of existing solutions, related to cornea position estimation, that it is hard to identify any false glints in the captured images, because accurate false glint detection requires an accurate estimate of the cornea position. Attempts have previously been made to solve this problem by using optical-flow like methods. This may work if a big enough area around the eye is captured in the images. However, if only a very small region around the pupil/iris is captured, this kind of method will not work. The solutions described herein, however, work even if the image shows only a very small region around the pupil/iris.

Solutions to the problems are provided by the embodiments described herein, in the description and the appended claims.

One clear advantage of embodiments herein is thus that the eye tracking or gaze tracking result becomes more accurate since the system will be able to more reliably estimate the user's 3D cornea position compared to prior solutions when the cornea is moving. As a consequence, a further advantage is that the present solution is more robust.

Of course, the embodiments described herein also work perfectly well when the eye and cornea is not moving, but is static.

A further advantage is that the visual result and user experience is improved when the eye tracking or gaze tracking result becomes more accurate.

Embodiments herein hence provide a 3D cornea position estimation that is both low in noise and responsive to movement, and that works well for eye tracking of a user not moving his/her eyes, as well as for eye tracking of a user moving his/her gaze.

The term eye tracking as used herein may be understood as comprising any of: tracking or observing actual parts of an eye, in the real world, in a 3D model of the eye, in a 2D image depicting the eye; or determining what the eye is tracking or gazing towards. Determination of what the eye is tracking or gazing towards may also be referred to as gaze tracking.

Any embodiment described herein as referring to one eye, for instance a first eye, of a user is of course equally applicable to any of the user's eyes, and may also be performed for both the eyes of a user in parallel, or consecutively.

Throughout the present disclosure, the term obtaining information may be understood as receiving information, in a push fashion, and/or retrieving information, in a pull fashion. As a specific example, obtaining an image may in the context of this description be understood as: capturing an image, using an imaging device 110, for example a camera; receiving an image, for example from an imaging device, which may be the imaging device 110, or from a memory; or retrieving an image, for example from an imaging device 110, which may be a camera, or from a memory.

Methods, systems and associated storage media for controlling an eye tracking system will be described below with reference to FIGS. 1-11. First, an illustrative example of an eye will be described with reference to FIG. 1 and FIG. 4.

FIG. 1 is a front view of an eye 100. FIG. 4 comprises a cross sectional view of the eye 100 from the side of the eye 100. While FIG. 4 shows more or less the entire eye 100, the front view presented in FIG. 1 only shows those parts of the eye 100 which are typically visible from in front of a person's face. The eye 100 has a cornea 104, an iris 101 and a pupil 102 which are visible in the front view. The reference 103 refers both to the pupil center and the cornea center, as these are co-located from the front view. In FIG. 1, a first set 106' of one or more first candidate glints 106" is illustrated, the one or more first candidate glints 106" being caused by a reflection 106 of light from a first illuminator 112 reflected from the cornea 104 of the eye 100, as illustrated in FIG. 4. The one or more first candidate glints 106" are illustrated in more detail in FIG. 5. FIG. 5 further shows an example of a first predicted two-dimensional, 2D, glint position $P_1$. In FIG. 1, a second set 107' of one or more second candidate glints 107" is also shown, the one or more second candidate glints 107" being caused by a reflection 107 of light from a second illuminator 113 reflected from the cornea 104 of the eye 100, as illustrated in FIG. 4. The one or more second candidate glints 106" are illustrated in more detail in FIG. 6. FIG. 6 further shows an example of a second predicted two-dimensional, 2D, glint position $P_2$.

System Architecture

System embodiments will now be described with reference to FIGS. 2, 3, 4 and 7.

Figure 3:
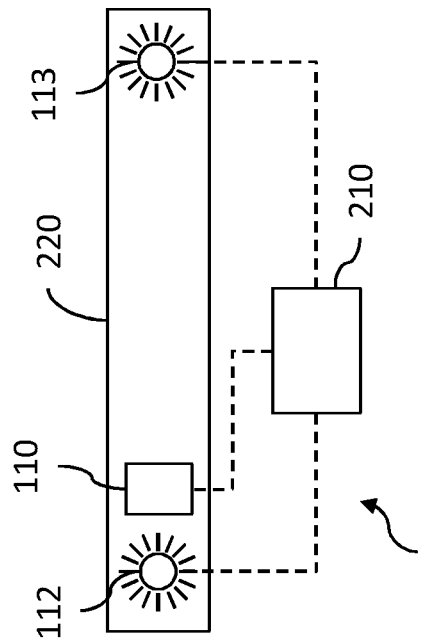
FIG. 3 shows a schematic overview of an eye tracking system, according to one or more embodiments.
Figure 2:
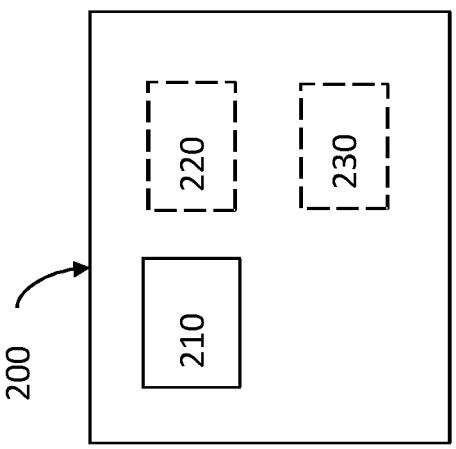
FIG. 2 shows a schematic overview of an eye tracking system, according to one or more embodiments.
Figure 7:
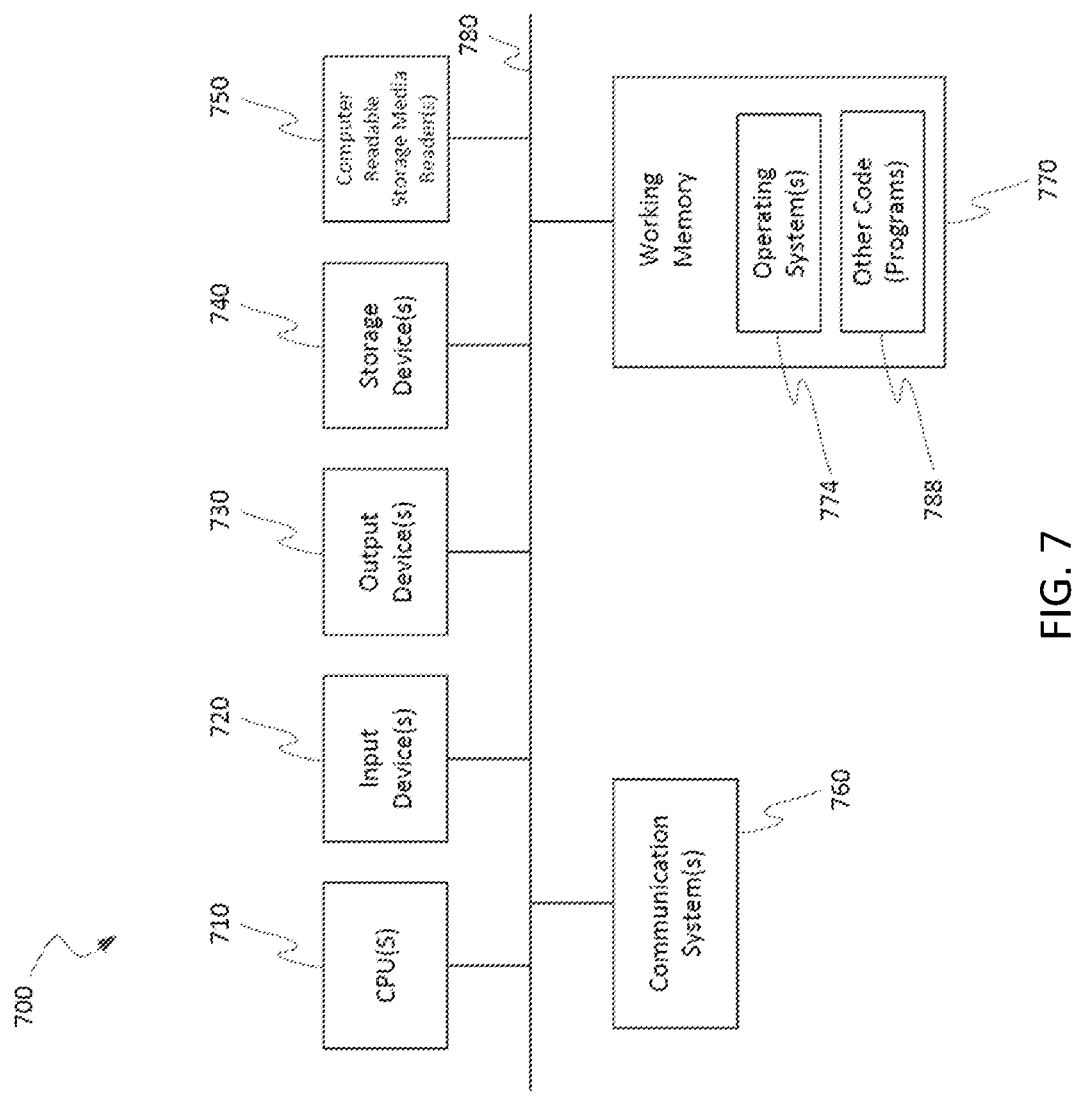
FIG. 7 is a block diagram illustrating a specialized computer system, according to an embodiment.

FIGS. 2 and 3 are schematic overviews of an eye tracking system 200 comprising eye tracking equipment 220, and processing circuitry 210, according to one or more embodiments. FIG. 4 shows a schematic overview of an eye 100 of a user and components of an eye tracking system 200 comprising eye tracking equipment and processing circuitry 210. FIG. 7 is a block diagram illustrating a specialized computer system 301 in which embodiments of the present disclosure may be implemented.

Turning first to FIGS. 2 and 3, there is shown an eye tracking system 200 comprising processing circuitry 210.

The eye tracking system 200 (which may also be referred to as a gaze tracking system) according to an embodiment comprises, or is connected to or associated with eye tracking equipment 220 comprising at least one first illuminator 112 and at least one second illuminator 113, for actively illuminating the eyes of a user and at least one imaging device 110 for capturing images of the eyes of the user.

The imaging device 110 may for example a camera. However, the imaging device 110 can be any other type of imaging device, including imaging sensors, light sensors etc.

The first illuminator 112 and the second illuminator 113 may each be emitting light in the infrared frequency band, or in the near infrared frequency (NIR) band. The illuminators 112, 113 may be light emitting diodes, lasers, such as vertical-cavity surface-emitting lasers (VCSELs) or any other type of illuminators. The term illuminator may be understood as comprising a single illuminator, or alternatively as comprising a group of two or more illuminators that are arranged very closely together and controlled to act as a single light source, i.e. which are controlled to operate such that they together cause a single glint when illuminated.

In one alternative, the first illuminator 112 is a bright pupil (BP) illuminator arranged coaxially with (or close to) the imaging sensor of the imaging device 110, so that the imaging device 110 may capture bright pupil images of the user's eyes, if the first illuminator 112 emits light at, or close to, its maximum power. In this case, due to the coaxial arrangement of the first illuminator 112 and the imaging sensor of the imaging device 110, light reflected from the retina of an eye 100, at point 106, returns back out through the pupil 102 towards the imaging device 110, so that the pupil 102 appears brighter than the iris 101 surrounding it in images where the first illuminator 112 illuminates the eye. Thereby, the eye tracking system 200 is configured to obtain BP images of the user's eye 100. The one or more second illuminator 113 may in this embodiment be arranged non-coaxially with (or further away from) the imaging sensor of the imaging device 110 for capturing dark pupil (DP) images. Such an arrangement is illustrated in FIG. 3. Due to the non-coaxial arrangement of the one or more second illuminator 113 and the imaging sensor of the imaging device 110, light reflected at point 107 in FIG. 4 does not reach the imaging sensor of the imaging device 110 and the pupil appears darker than the iris surrounding it in images where a second illuminator 113 illuminates the eye.

Hereinafter, the imaging sensor of the imaging device 110 may also be referred to as simply the imaging device 110.

In another alternative, the eye tracking system 200 comprises at least two DP illuminators arranged non-coaxially with the imaging device 110. Both the first illuminator 112 and the second illuminator 113 may in this alternative be DP illuminators. For this arrangement to work satisfactorily according in embodiments presented herein, it is important that the first and second illuminators 112, 113 are not co-located. In other words, it is important that the first and second illuminators 112, 113 are arranged at least a certain minimum distance from each other. For example, the distance needs should be selected to be big enough, in the camera plane or image plane, to ensure that the glints caused by the illuminators 112, 113 do not coincide in the captured images. Thereby, the respective glints (or distributions of candidate glint) 106" and 107", can be distinguished from each other.

The imaging device 110 may for example be a camera, such as a complementary metal oxide semiconductor (CMOS) camera or a charged coupled device (CCD) camera. However, the imaging device 110 may be any other type of imaging device, including imaging sensors, light sensors etc.

FIG. 4 also shows, for purpose of understanding, a screen 111 towards which the user eye 100 is gazing.

In one or more embodiment, there is provided an eye tracking system 200 for 3D cornea position estimation, the eye tracking system 200 comprising processing circuitry 210 configured to generate a cornea movement filter, CMF, comprising an estimated initial 3D position, x1, y1, z1, and an estimated initial 3D velocity, vx1, vy1, vz1, of the cornea center 103 of the eye 100 at a first time instance, $t_1$.

To obtain a start value for the estimated initial 3D position, x1, y1, z1, and an estimated initial 3D velocity, vx1, vy1, vz1, of the cornea center 103, the processing circuitry 210 may be configured, to the first time the method is performed, set a respective start value for the estimated initial 3D position, x1, y1, z1, and the estimated initial 3D velocity, vx1, vy1, vz1, of the cornea center 103 of the eye 100 at the first time instance, $t_1$, based on a respective estimated 3D position and velocity of an eye or the head of the user.

The processing circuitry 210 is further configured to predict a first two-dimensional, 2D, glint position $P_1$ in an image captured at a second time instance, $t_2$, by applying the cornea movement filter, CMF, wherein the predicted first glint position represents a position where a first glint is predicted to be generated by a first illuminator 112 associated with the eye tracking system 200, and to predict a second 2D glint position $P_2$ in an image captured at the second time instance, $t_2$, by applying the cornea movement filter, CMF, wherein the predicted second glint position represents a position where a glint is predicted to be generated by a second illuminator 113 associated with the eye tracking system 200. The processing circuitry 210 is further configured to perform image processing to identify at least one first candidate glint 106" in a first image 600 captured by the imaging device 110 at the second time instance, $t_2$, wherein the first image 600 comprises at least part of the cornea 101 of the eye 100 and at least one glint generated by the first illuminator 112, and to identify at least one second candidate glint 107" in the first image 600 or in a second image 601 captured by the imaging device 110 at a third time instance, $t_3$ and comprising at least part of the cornea 101 of the eye 100 and at least one glint generated by the second illuminator 113.

If the at least one second candidate glint 107" is identified in the second image 601 captured by the imaging device 110 at a third time instance, $t_3$, the processing circuitry 210 may in one or more embodiments further be configured to compensate for the movement of the at least one second candidate glint 107" from the second time instance, $t_2$, to the third time instance, $t_3$, by applying the cornea movement filter, CMF, to adjust the projected 2D position of at least one second candidate glint 107" into an estimated 2D position at the second time instance, $t_2$, before updating the cornea movement filter, CMF. Thereby, large gaze errors caused by wrongly estimated glint positions is avoided in cases where we are using glints generated at different times, for example BP glints and DP glints from two images captured in succession, at $t_1$ and $t_2$ respectively, with a BP illuminator illuminated at $t_2$ and a DP illuminator illuminated at $t_3$, or vice versa. Without this motion compensation, large gaze errors may occur, causing significantly reduced eye tracking performance and user experience.

Suitably, the processing circuitry 210 is further configured to select a pair of a first and second candidate glint 106", 107", out of all possible pairs of a first candidate glint 106" and a second candidate glint 107", that is determined to have the highest probability of corresponding to the predicted first and second glint positions $P_1$, $P_2$, based on a probability estimation function. In one embodiment, the processing circuitry 210 may be configured to make the prediction based on a probability function by performing a statistical test on the predicted first and second glint positions $P_1$, $P_2$ in relation to each possible pair of glints 106", 107". In another embodiment the processing circuitry 210 may be configured to make the prediction based on a probability function by performing pixel distance comparison between the predicted first and second glint positions $P_1$, $P_2$ in relation to each possible pair of glints 106",107" in the set of candidate glints. Any other suitable probability function may also be employed.

Advantageously, the processing circuitry 210 is further configured to estimate the current 3D position, xc, yc, zc, of the cornea based on the positions of the selected pair of first and second candidate glints. The processing circuitry may then be configured to by set the estimated initial 3D position, x1, y1, z1, of the cornea center 103 to the current 3D position, xc, yc, zc, of the cornea center 103. Thereby, the cornea movement filter, CMF, may be updated to use the most recent cornea position estimation, enabling continuously improved cornea position estimation over time, if the method according to this embodiment is performed repeatedly.

The processing circuitry may also be configured to determine a current estimated 3D velocity, vxc, vyc, vzc, of the cornea center 103 based on the estimated initial 3D position, x1, y1, z1, of the cornea center 103 and the current 3D position, xc, yc, zc, of the cornea center 103 and setting the estimated initial 3D velocity, vx1, vy1, vz1, of the cornea center 103 to the current estimated 3D velocity, vxc, vyc, vzc, of the cornea center 103. Thereby, the cornea movement filter, CMF, may be further updated to use the most recent cornea velocity estimation, enabling continuously even further improved cornea position estimation over time, if the method according to this embodiment is performed repeatedly.

In some embodiments, the processing circuitry 210 may be configured to update the cornea movement filter, CMF, preferably using the Extended Kalman Filter equation and a linearized version of the cornea-to-glint-pair equations.

Alternatively, the processing circuitry 210 may be configured to maintain a constant velocity over time. The constant velocity may be maintained at the value of the first estimated initial 3D velocity, vx1, vy1, vz1. In yet another alternative embodiment, the processing circuitry 210 may be configured to adjust the estimated 3D velocity to decrease and to approach zero over time.

In one or more embodiments, the processing circuitry 210 is configured to perform the steps and functions according to any of the embodiments presented herein repeatedly.

In one or more embodiments, the processing circuitry 210 may be configured to select a pair of a first and second candidate glint 106", 107", out of all possible pairs of a first candidate glint 106" and a second candidate glint 107", that has the highest probability of corresponding to the predicted first and second glint positions $P_1$, $P_2$, by: determining the probability that the positions of the first and second candidate glint 106", 107" in the glint pair correspond to the predicted first and second glint positions $P_1$, $P_2$; determine the closeness of the glint pair to a selected part of the eye 100; and selecting a glint pair from the more than glint pair based on the result from the probability determination and the closeness determination.

In some embodiments, the processing circuitry 210 is further configured to, before updating the cornea movement filter, CMF: compare the probability of the selected pair of candidate glints 106", 107" to a preset threshold value $V_{PROB}$; and if the probability of the selected pair of candidate glints 106", 107" exceeds the preset threshold value $V_{PROB}$, set the predicted first and second glint positions $P_1$, $P_2$ to the positions of the selected pair of candidate glints 106", 107". Thereby, if reliable enough, the most recent information of the 2D position of the glint pair is fed back into the method and used for further improving the 3D cornea position estimation result.

Suitably, the eye tracking system 200 may be configured to perform eye tracking of an eye of a user (or both eyes) employing the improved 3D cornea position estimation according to any of the embodiments presented herein. The eye tracking system 200 may in these cases advantageously be configured to predict the gaze of the user based on the estimated current 3D position, xc, yc, zc, of the cornea.

The processing circuitry 210 may further be configured to perform the above functions repeatedly.

The eye tracking system 200 may further be configured to perform eye tracking, with the improved robustness in 3D cornea position estimation obtained by any of the embodiments presented herein.

FIG. 7 is a block diagram illustrating a specialized computer system 700 in which embodiments of the present disclosure may be implemented. This example illustrates a specialized computer system 700 such as may be used, in whole, in part, or with various modifications, to provide the functions of components described herein.

Specialized computer system 700 is shown comprising hardware elements that may be electrically coupled via a bus 780. The hardware elements may include one or more central processing units, or processors, 710, one or more input devices 720 (e.g., a mouse, a keyboard, eye tracking device, etc.), and one or more output devices 730 (e.g., a display device, a printer, etc.). Specialized computer system 700 may also include one or more storage devices 740. By way of example, storage device(s) 740 may be disk drives, optical storage devices, solid-state storage devices such as a random access memory ("RAM") and/or a read-only memory ("ROM"), which can be programmable, flash-updateable and/or the like.

Specialized computer system 700 may additionally include a computer-readable storage media reader 750, a communications system 760 (e.g., a modem, a network card (wireless or wired), an infra-red communication device, Bluetooth™ device, cellular communication device, etc.), and working memory 380, which may include RAM and ROM devices as described above. In some embodiments, specialized computer system 700 may also include a working memory 770, which can include an operating system(s) 774 and other code (programs) 788. In some embodiments, specialized computer system may also include a processing acceleration unit, which can include a digital signal processor, a special-purpose processor and/or the like.

Eye tracking performed by systems such as the system 300 in FIG. 2 or 3, or the system 301 in FIG. 7, typically employ an eye model. This eye model is calibrated to properties of the individual user's eye or eyes, in manners known in the art.

The display optics is to be understood as comprising any optics suitable for generating and/or displaying 2D image data, 3D image data, graphical data, holographic data or other content that may be presented to a user/wearer of the head-mounted device to convey a VR, AR, MR or other XR experience. The display optics may comprise one or more displays 111, e.g. a single display 111 located in front of the eyes of the user, or one display 111 located in front of a first eye 100 of the user and a second display located in front of a second eye of the user. In other words, the term head-mounted device may, but should not necessarily, be construed as only referring to the actual display optics intended to be arranged in front of an eye of the user, or in front of both eyes of the user.

The one or more cameras may for example be charged-coupled device (CCD) cameras or Complementary Metal Oxide Semiconductor (CMOS) cameras. However, other types of cameras may also be envisaged.

The system 200 may further comprise, or be communicatively connected to, a display 111. The display 111 may for example be a liquid-crystal display (LCD) or a LED display. However, other types of displays may also be envisaged. The display may for example be flat or curved. The display 111 may for example be placed in front of one of the user's eyes.

The processing circuitry 210 may for example comprise one or more processors. The processor(s) may for example be application-specific integrated circuits (ASIC) configured to perform a specific eye tracking and position determination method. Alternatively, the processor(s) may be configured to execute instructions (for example in the form of a computer program) stored in one or more memories 140. Such a memory 140 may for example be comprised in the system 200, or may be external to (for example located remotely from) the system 200. The memory 140 may store instructions for causing the system 200 to perform a method according to any of the embodiments presented in connection with FIG. 2.

The processing circuitry 210 may in one or more embodiment be configured to perform any or all of the method embodiments described in connection with FIG. 4.

It will be appreciated that the system 200 embodiments described above with reference to FIGS. 2, and 3 is provided as examples, and that many other systems may be envisaged. For example, the system 200 may consist only of the processing circuitry 210.

Method Embodiments

In the following, method embodiments will be described in connection with FIG. 8.

Figure 8:
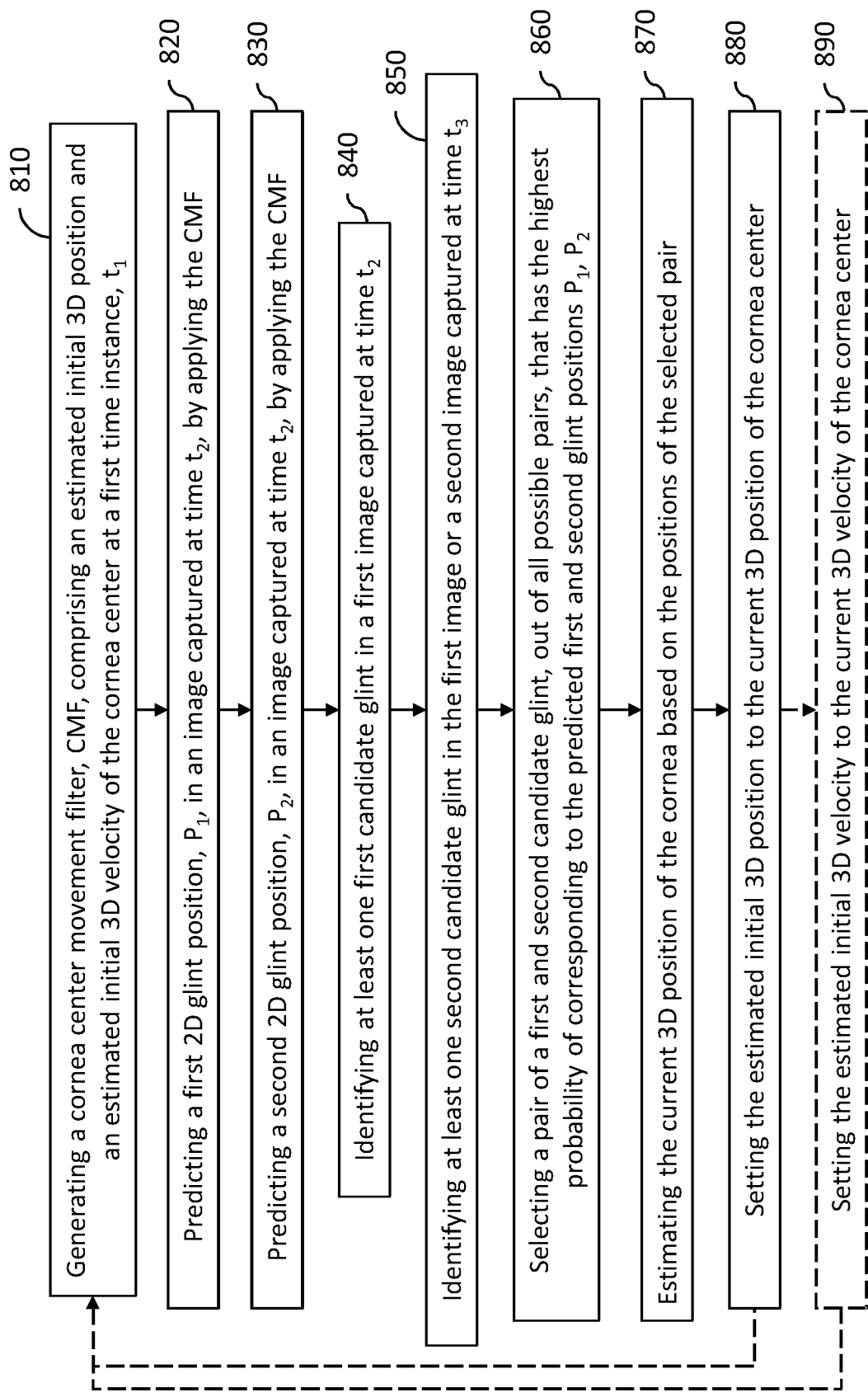
FIG. 8 is a flow chart of a method according to one or more embodiments.

FIG. 8 shows embodiments of a method for performing three-dimensional, 3D, position estimation for the cornea center 103 of an eye 100 of a user, using a remote eye tracking system 200, when the cornea center 103 moves over time in relation to an imaging device 110 associated with the eye tracking system 200, the method comprising:

In step 810: generating, using processing circuitry 210 associated with the eye tracking system 200, a cornea movement filter, CMF, comprising an estimated initial 3D cornea position, x1, y1, z1, and an estimated initial 3D cornea velocity, vx1, vy1, vz1, of the cornea center 103 of the eye 100 at a first time instance, $t_1$.

In one or more embodiments, the estimated initial 3D cornea position, x1, y1, z1, is an estimated position distribution, which may be in the form of a Gaussian distribution, but may also be any other suitable distribution.

In one or more embodiments, the estimated initial 3D cornea velocity, vx1, vy1, vz1, is an estimated velocity distribution, which may be in the form of a Gaussian distribution, but may also be any other suitable distribution.

The cornea movement filter, CMF, may be a Kalman filter X, e.g. having the form:

$$X = \begin{bmatrix} x \\ y \\ z \\ vx \\ vy \\ vz \end{bmatrix}$$

wherein x, y, z represents a 3D point in space with a velocity vx, vy, vz.

The first time the method is performed, the respective start value for the estimated initial 3D position, x1, y1, z1, and the estimated initial 3D velocity, vx1, vy1, vz1, of the cornea center 103 of the eye 100 at the first time instance, $t_1$, may be set based on a respective estimated 3D position and velocity of an eye or the head of the user.

In step 820: predicting, using the processing circuitry 210, a first two-dimensional, 2D, glint position $P_1$ in an image captured at a second time instance, $t_2$, by applying the cornea movement filter, CMF, to the estimated initial 3D cornea position, x1, y1, z1.

In other words, the predicted first glint position $P_1$ represents a 2D position, projected onto an image plane, where a first glint is predicted to be generated. The first glint is caused by light emitting from a first illuminator 112 associated with the eye tracking system 200 reflecting off the cornea of the user's eye after the cornea has moved from the estimated initial 3D cornea position, x1, y1, z1.

In step 830: predicting, using the processing circuitry 210, a second 2D glint position $P_2$ in an image captured at the second time instance, $t_2$, by applying the cornea movement filter, CMF, wherein the predicted second glint position represents a position where a glint is predicted to be generated by a second illuminator 113 associated with the eye tracking system 200.

In step 840: performing image processing, using the processing circuitry 210, comprising the step of identifying at least one first candidate glint 106" in a first image 600 captured by the imaging device 110 at the second time instance, $t_2$, wherein the first image 600 comprises at least part of the cornea 101 of the eye 100 and at least one glint generated by the first illuminator 112.

Performing image processing to identify at least one first candidate glint 106" in a first image 600 may comprise using intensity thresholding based on intensity values of the pixels in the first image 600.

Step 840 may comprise determining at set of pixel positions representing each of the at least one first candidate glint 106". Step 840 may further comprise storing said sets of pixel positions representing each of the at least one first candidate glint 106" in memory for later retrieval.

In one or more embodiment, the at least one first candidate glint 106" identified in the image may represent a projected probability distribution of a reflection 106. In some embodiments, the projected probability distribution may be a Gaussian distribution.

In step 850: performing image processing, using the processing circuitry 210, comprising the step of identifying at least one second candidate glint 107" in the first image 600 or in a second image 601 captured by the imaging device 110 at a third time instance, $t_3$ and comprising at least part of the cornea 101 of the eye 100 and at least one glint generated by the second illuminator 113.

Performing image processing to identify at least one second candidate glint 107" in a first image 600 may comprise using intensity thresholding based on intensity values of the pixels in the first or second image 600, 601.

Step 850 may comprise determining at set of pixel positions representing each of the at least one second candidate glint 107". Step 850 may further comprise storing said sets of pixel positions representing each of the at least one second candidate glint 107" in memory for later retrieval.

In one or more embodiment, the at least one second candidate glint 107" identified in the image may represent a projected probability distribution of a reflection 107. In some embodiments, the projected probability distribution may be a Gaussian distribution.

If the at least one second candidate glint 107" is identified in the second image 601 captured by the imaging device 110 at a third time instance, $t_3$, the method may in one or more embodiments further comprising compensating for the movement of the at least one second candidate glint 107" from the second time instance, $t_2$, to the third time instance, $t_3$, by applying, by the processing circuitry 210, the cornea movement filter, CMF, to adjust the projected 2D position of at least one second candidate glint 107" into an estimated 2D position at the second time instance, $t_2$, before updating the cornea movement filter, CMF. Thereby, large gaze errors caused by wrongly estimated glint positions is avoided in cases where we are using glints generated at different times. This may for example otherwise be the case if a BP or DP glint is depicted in a first image captured at a time instance $t_2$, and another BP or DP glint is depicted in a second image captured at a time instance $t_3$. Without motion compensation, large gaze errors may hence occur, causing significantly reduced eye tracking performance and user experience.

Regarding steps 840 and 850, the first image 600, as well as any second image 601, may depict the entire eye 100 of the user, or it may parts of the eye 100, including at least part of the cornea 101 of the eye 100 and at least one glint generated by the first illuminator 112.

There exist methods for selecting a part of an image for eye tracking processing. An example is found in United States Patent Application US 2010/0328444. The full specification of this patent application is herein incorporated by reference.

In step 860: selecting, using the processing circuitry 210, a pair of a first and second candidate glint 106", 107", out of all possible pairs of a first candidate glint 106" and a second candidate glint 107", that has the highest probability of corresponding to the predicted first and second glint positions $P_1$, $P_2$, based on a probability estimation function.

In one or more embodiment, selecting from the set of candidate glints a pair of candidate glints 106",107" having the highest probability to correspond to the predicted first and second glint positions $P_1$, $P_2$, based on a probability estimation function comprises performing a statistical test on the predicted first and second glint positions $P_1$, $P_2$ in relation to each possible pair of glints 106",107".

In another embodiment, selecting from the set of candidate glints a pair of candidate glints 106",107" having the highest probability to correspond to the predicted first and second glint positions $P_1$, $P_2$, based on a probability estimation function comprises performing pixel distance comparison between the predicted first and second glint positions $P_1$, $P_2$ in relation to each possible pair of glints 106",107" in the set of candidate glints.

Figure 9:
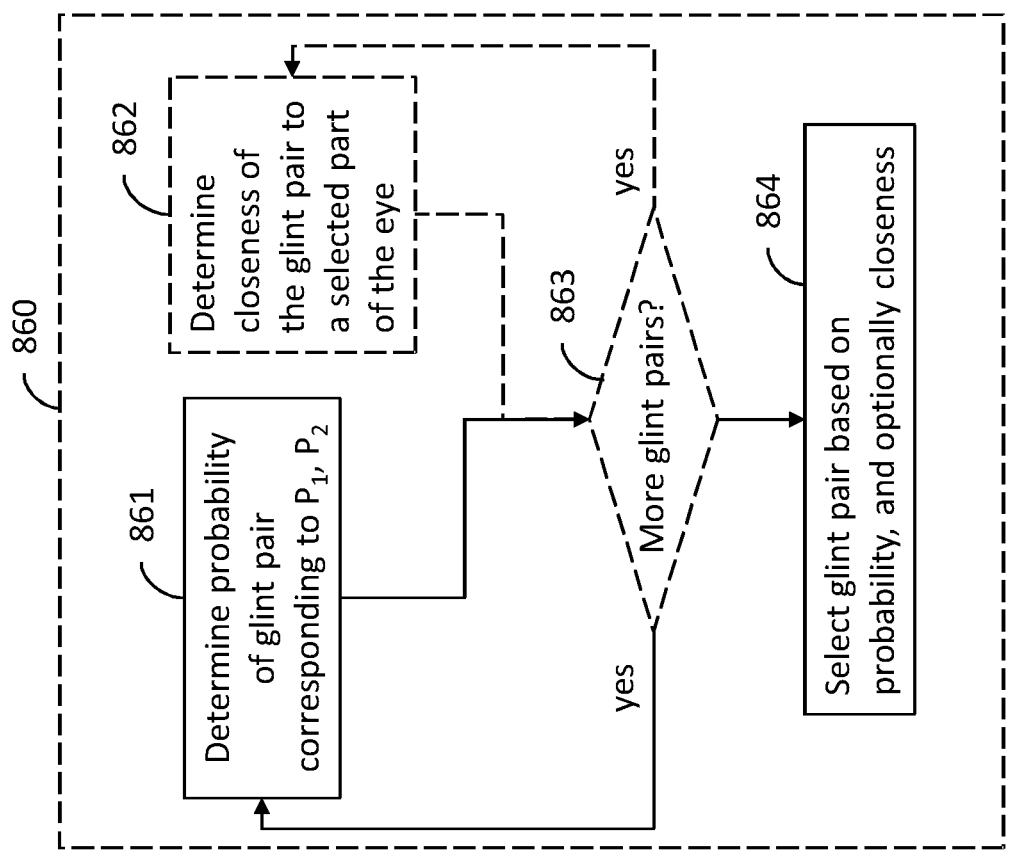
FIG. 9 is a flow chart of a method according to one or more embodiments.

FIG. 9 illustrates a specific embodiment of method step 860, comprising, for each pair of a first and second candidate glint 106", 107", out of all possible pairs of a first candidate glint 106" and a second candidate glint 107":

In sub-step 861: Determine the probability that the positions of the first and second candidate glint 106", 107" in the glint pair correspond to the predicted first and second glint positions $P_1$, $P_2$.

The probability that the positions of the first and second candidate glint 106", 107" in the glint pair correspond to the predicted first and second glint positions $P_1$, $P_2$ may be determined according to any of the embodiments described under step 860, or in any other suitable manner.

In an optional sub-step 862: Determine the closeness of the glint pair to a selected part of the eye 100.

In one or more embodiment, the selected part of the eye 100 is the cornea center 103.

Distance to the cornea center may be determined as the pixel distance, or other suitable 2D distance, from the pair of candidate glints 106", 107" (a combination of the distance from each candidate glint 106", 107" or from a position selected to represent the pair) to the position of the cornea center 103, when projected onto the image plane.

As a non-limiting example, Mahalanobis distance may be used for the distance determination.

In an optional sub-step 863: Check if there are more glint pairs to be assessed.

If there are more glint pairs to be assessed, return to sub-step 861 and, optionally, sub-step 862. Otherwise go to sub-step 864.

In sub-step 864: Selecting a glint pair from the more than glint pair based on the result from the probability determination, and optionally also the closeness determination.

For example, a glint pair may be selected based on it having the highest probability that the positions of the first and second candidate glint 106", 107" in the glint pair correspond to the predicted first and second glint positions $P_1$, $P_2$.

Figure 10:
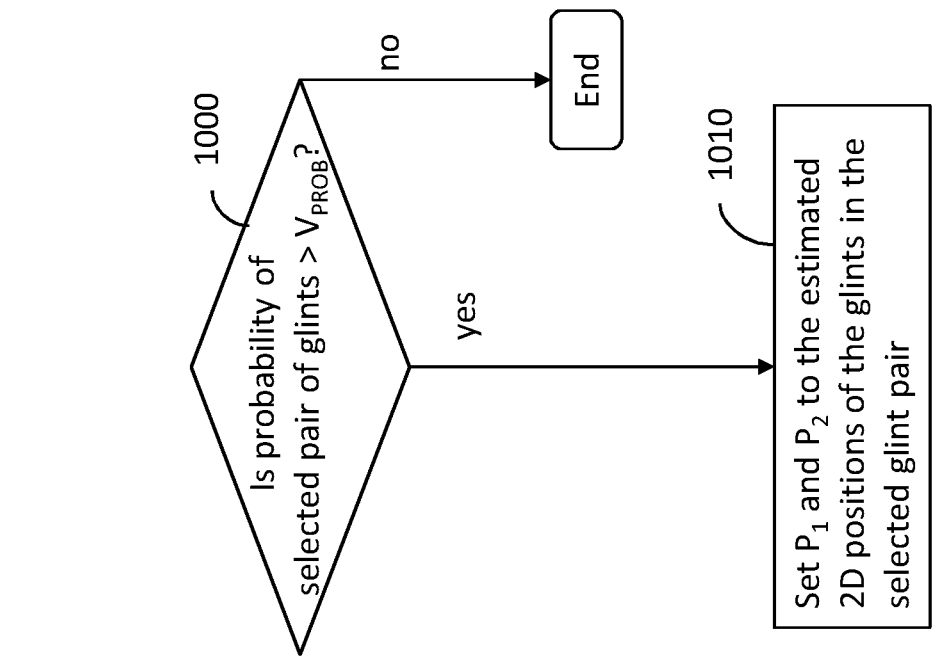
FIG. 10 is a flow chart of a method according to one or more embodiments.

Alternatively, the selection may be based on the glint pair having both a probability that the positions of the first and second candidate glint 106", 107" in the glint pair correspond to the predicted first and second glint positions $P_1$, $P_2$ and a determined closeness that, taken together, make the positions of the glint pair the most probably to correspond to the positions of the first and second candidate glint 106", 107" in the glint pair correspond to the predicted first and second glint positions $P_1$, $P_2$ After the selecting in Step 860, and before Step 870, the method may, as illustrated in FIG. 10, optionally comprise the following sub-method:

In sub-step 1000: comparing the probability of the selected pair of candidate glints 106", 107" to a preset threshold value, $V_{PROB}$.

If the probability of the selected pair of candidate glints 106", 107" exceeds the preset threshold value, $V_{PROB}$, the method continues with sub-step 1010.

If the probability of the selected pair of candidate glints 106", 107" does not exceed the preset threshold value, $V_{PROB}$, the sub-method ends.

In sub-step 1010: setting the predicted first and second glint positions $P_1$, $P_2$ to the positions of the selected pair of candidate glints 106", 107".

Thereby, if reliable enough, the most recent information of the 2D position of the glint pair is fed back into the method and used for further improving the 3D cornea position estimation result.

Returning now to FIG. 8, the method further comprises:

In step 870: estimating the current 3D position, xc, yc, zc, of the cornea, using the processing circuitry 210, based on the positions of the selected pair of first and second candidate glints 106", 107".

In step 880: setting the estimated initial 3D position, x1, y1, z1, of the cornea center 103 to the current 3D position, xc, yc, zc, of the cornea center 103.

Step 880 may include updating the cornea movement filter, CMF, using the processing circuitry 210, by setting the estimated initial 3D cornea position, x1, y1, z1, comprised in the CMF to the current 3D position, xc, yc, zc, of the cornea center 103. In some embodiments, updating the cornea movement filter, CMF, is done using the Extended Kalman Filter equation and a linearized version of the cornea-to-glint-pair equations.

In an optional step 890: determining a current estimated 3D velocity, vxc, vyc, vzc, of the cornea center 103 based on the estimated initial 3D position, x1, y1, z1, of the cornea center 103 and the current 3D position, xc, yc, zc, of the cornea center 103, and thereafter setting the estimated initial 3D velocity, vx1, vy1, vz1, of the cornea center 103 to the current estimated 3D velocity, vxc, vyc, vzc, of the cornea center 103.

The optional step 890 may include further updating the cornea movement filter, CMF, using the processing circuitry 210, by setting the estimated initial 3D cornea velocity, vx1, vy1, vz1, comprised in the CMF to the current 3D velocity, vxc, vyc, vzc, of the cornea center 103. In some embodiments, updating the cornea movement filter, CMF, is done using the Extended Kalman Filter equation and a linearized version of the cornea-to-glint-pair equations.

As an alternative to the optional step 890, the 3D cornea velocity may be assumed to be constant over time. This is a computationally non-expensive and non-complex solution that works sufficiently well in many applications. Preferably a start value for the estimated initial 3D cornea velocity, vx1, vy1, vz1, is determined, as described herein, and the 3D cornea velocity is kept at this constant value.

As another alternative to the optional step 890, the 3D cornea velocity may be assumed to decrease and to approach zero over time. This is also a computationally non-expensive and non-complex solution that works sufficiently well in many applications, and may provide improved performance compared to the alternative of keeping the velocity constant.

The method according to any of the embodiments described in connection with FIGS. 8, 9 and 10 may be performed repeatedly. This is indicated in FIG. 8 by the dashed arrows leading from step 880 and 890, respectively, back to step 810. The method may for example be repeated every frame, or at certain preset time intervals, or in any other suitable manner. This setting may for instance be preset in the eye tracking system 200.

In combination with any of the embodiments presented herein for estimating the 3D position of the cornea, the method may further comprise performing eye tracking. Specifically, the method may for example comprise predicting, by the eye tracking system 200, a gaze of the user based on the estimated current 3D position, xc, yc, zc, of the cornea.

The processing circuitry 210 may correspondingly be configured to performing any or all of the method embodiments described herein.

Further Embodiments

In one or more embodiment, there is provided a non-transitory computer-readable storage medium storing instructions which, when executed by processing circuitry 210 of the system 200, cause the system 200 to perform the method as defined in any of the method embodiments disclosed herein (in other words, in the claims, the summary, or the detailed description).

The non-transitory computer-readable storage medium may store instructions which, when executed by processing circuitry 210 of the system 200, cause the system 200 to: generate a cornea movement filter, CMF, comprising an estimated initial 3D position, x1, y1, z1, and an estimated initial 3D velocity, vx1, vy1, vz1, of the cornea center 103 of the eye 100 at a first time instance, $t_1$; predict a first two-dimensional, 2D, glint position $P_1$ an image captured at a second time instance, $t_2$, by applying the cornea movement filter, CMF, wherein the predicted first glint position represents a position where a first glint is predicted to be generated by a first illuminator 112 associated with the eye tracking system 200; predict a second 2D glint position $P_2$ in an image captured at the second time instance, $t_2$, by applying the cornea movement filter, CMF, wherein the predicted second glint position represents a position where a glint is predicted to be generated by a second illuminator 113 associated with the eye tracking system 200; perform image processing to: identify at least one first candidate glint 106" in a first image 600 captured by the imaging device 110 at the second time instance, $t_2$, wherein the first image 600 comprises at least part of the cornea 101 of the eye 100 and at least one glint generated by the first illuminator 112; and identify at least one second candidate glint 107" in the first image 600 or in a second image 601 captured by the imaging device 110 at a third time instance, $t_3$ and comprising at least part of the cornea 101 of the eye 100 and at least one glint generated by the second illuminator 113; select a pair of a first and second candidate glint 106", 107", out of all possible pairs of a first candidate glint 106" and a second candidate glint 107", that has the highest probability of corresponding to the predicted first and second glint positions $P_1$, $P_2$, based on a probability estimation function; estimate the current 3D position, xc, yc, zc, of the cornea based on the positions of the selected pair of first and second candidate glints 106", 107"; and update the cornea movement filter, CMF, by setting the estimated initial 3D position, x1, y1, z1, of the cornea center 103 to the current 3D position, xc, yc, zc, of the cornea center 103.

The non-transitory computer-readable storage medium may further store instructions which, when executed by processing circuitry 210 of a system 200, cause the system to determine a current estimated 3D velocity, vxc, vyc, vzc, of the cornea center 103 based on the estimated initial 3D position, x1, y1, z1, of the cornea center 103 and the current 3D position, xc, yc, zc, of the cornea center 103, and to set the estimated initial 3D velocity, vx1, vy1, vz1, of the cornea center 103 to the current estimated 3D velocity, vxc, vyc, vzc, of the cornea center 103. Thereby, the CMF is updated with the most recently estimated cornea velocity, the current estimated 3D velocity vxc, vyc, vzc, next time it is used, which contributes to continuously improving the cornea position estimation.

In one or more embodiments, the non-transitory computer-readable storage medium may further store instructions which, when executed by processing circuitry 210 of the system 200, cause the system 200 to perform the method defined in any of the method embodiments.

In some embodiments, the non-transitory computer-readable storage medium may further store instructions which, when executed by processing circuitry 210 of the system 200, cause the system 200 to perform the method defined in any of the method embodiments repeatedly.

The non-transitory computer-readable storage medium may for example be provided in a computer program product. In other words, a computer program product may for example comprise a non-transitory computer-readable storage medium storing instructions which, when executed by the processing circuitry 210 of the system 200, cause the system 200 to perform the method as defined in any of the method embodiments.

As described above with reference to FIG. 2, the storage medium need not necessarily be comprised in the system 200.

The person skilled in the art realizes that the present invention is by no means limited to the preferred embodiments described above. On the contrary, many modifications and variations are possible within the scope of the appended claims. For example, the embodiments described above with reference to FIGS. 8, 9 and 10 may, as explained herein, be performed in different orders and/or be combined with additional method steps to form further embodiments. Further, it will be appreciated that the system 200 shown in FIGS. 2, 3 and 7 are merely intended as examples, and that other systems may also perform the methods described above with reference to FIGS. 8, 9 and 10. For example, the system 200 may comprise only the processing circuitry 210.

It will be appreciated that the processing circuitry 210 (or a processor) may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide computer functionality, either alone or in conjunction with other computer components (such as a memory or storage medium).

It will also be appreciated that a memory or storage medium (or a computer-readable medium) may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by a processor or processing circuitry.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

The invention claimed is:

1. A method for performing three-dimensional, 3D, position estimation for a cornea center of an eye of a user, using a remote eye tracking system, when the cornea center moves over time in relation to an imaging device associated with the eye tracking system, the method comprising:
generating, using processing circuitry associated with the eye tracking system, a cornea movement filter, CMF, comprising an estimated initial 3D position and an estimated initial 3D velocity of the cornea center of the eye at a first time instance, wherein the cornea movement filter, CMF, is a Kalman filter;
predicting, using the processing circuitry:
a first two-dimensional, 2D, glint position in an image captured at a second time instance by applying the cornea movement filter, CMF, wherein the predicted first glint position represents a position where a first glint is predicted to be generated by a first illuminator associated with the eye tracking system; and
a second 2D glint position in the image captured at the second time instance by applying the cornea movement filter, CMF, wherein the predicted second glint position represents a position where a glint is predicted to be generated by a second illuminator associated with the eye tracking system;
performing image processing, using the processing circuitry, including the steps of:
identifying at least one first candidate glint in a first image captured by the imaging device at the second time instance wherein the first image comprises at least part of the cornea of the eye and at least one glint generated by the first illuminator; and
identifying at least one second candidate glint in the first image or in a second image captured by the imaging device at a third time instance and comprising at least part of the cornea of the eye and at least one glint generated by the second illuminator;
selecting, using the processing circuitry, a pair of a first and second candidate glint, out of all possible pairs of a first candidate glint and a second candidate glint, that has a highest probability of corresponding to the predicted first and second glint positions, based on a probability estimation function;
estimating a current 3D position of the cornea, using the processing circuitry, based on positions of the selected pair of first and second candidate glints; and updating the cornea movement filter, CMF, using the processing circuitry, by setting the estimated initial 3D position, of the cornea center to the current 3D position of the cornea center; and
determining a current estimated 3D velocity of the cornea center based on the estimated initial 3D position of the cornea center and the current 3D position of the cornea center; and
setting the estimated initial 3D velocity of the cornea center to the current estimated 3D velocity of the cornea center.

2. The method of claim 1, comprising performing the method steps of claim 1 repeatedly.

3. The method of claim 1, wherein updating the cornea movement filter, CMF, is done using an Extended Kalman Filter equation and a linearized version of cornea-to-glint-pair equations.

4. The method of claim 1, wherein selecting, using the processing circuitry, the pair of a first and second candidate glint, out of all possible pairs of a first candidate glint and a second candidate glint, that has the highest probability of corresponding to the predicted first and second glint positions comprises:
determining a probability that the positions of the first and second candidate glint in the glint pair correspond to the predicted first and second glint positions P1, P2;
determining a closeness of the glint pair to a selected part of the eye; and
selecting the glint pair from the possible glint pairs based on a result from the probability determination and the closeness determination.

5. The method of claim 1, the method further comprising, if the at least one second candidate glint is identified in the second image captured by the imaging device at a third time instance compensating for a movement of the at least one second candidate glint from the second time instance to the third time instance by applying the cornea movement filter, CMF, before updating the cornea movement filter, CMF.

6. The method of claim 1, further comprising, before updating the cornea movement filter, CMF:
comparing the probability of the selected pair of candidate glints to a preset threshold value; and
if the probability of the selected pair of candidate glints exceeds the preset threshold value, setting the predicted first and second glint positions to the positions of the selected pair of candidate glints.

7. The method of claim 1, further comprising, the first time the method is performed, setting a respective start value for the estimated initial 3D position and the estimated initial 3D velocity of the cornea center of the eye at the first time instance based on a respective estimated 3D position and velocity of the eye or head of the user.

8. The method of claim 1, further comprising predicting, by the eye tracking system, a gaze of the user based on the estimated current 3D position of the cornea.

9. An eye tracking system for performing three-dimensional, 3D, position estimation for a cornea center of an eye of a user when the cornea center moves over time in relation to an imaging device associated with the eye tracking system, the eye tracking system comprising processing circuitry configured to:
generate a cornea movement filter, CMF, comprising an estimated initial 3D position and an estimated initial 3D velocity of the cornea center of the eye at a first time instance, wherein the cornea movement filter, CMF, is a Kalman filter;
predict a first two-dimensional, 2D, glint position in an image captured at a second time instance by applying the cornea movement filter, CMF, wherein the predicted first glint position represents a position where a first glint is predicted to be generated by a first illuminator associated with the eye tracking system; and
predict a second 2D glint position in the image captured at the second time instance by applying the cornea movement filter, CMF, wherein the predicted second glint position represents a position where a glint is predicted to be generated by a second illuminator associated with the eye tracking system;
perform image processing to:
identify at least one first candidate glint in a first image captured by the imaging device at the second time instance, wherein the first image comprises at least part of the cornea of the eye and at least one glint generated by the first illuminator; and
identify at least one second candidate glint in the first image or in a second image captured by the imaging device at a third time instance and comprising at least part of the cornea of the eye and at least one glint generated by the second illuminator;
select a pair of a first and second candidate glint, out of all possible pairs of a first candidate glint and a second candidate glint, that has a highest probability of corresponding to the predicted first and second glint positions, based on a probability estimation function;
estimate a current 3D position of the cornea based on positions of the selected pair of first and second candidate glints; and
update the cornea movement filter, CMF, by setting the estimated initial 3D position of the cornea center to the current 3D position of the cornea center; and
determine a current estimated 3D velocity of the cornea center based on the estimated initial 3D position of the cornea center and the current 3D position of the cornea center; and
set the estimated initial 3D velocity of the cornea center to the current estimated 3D velocity of the cornea center.

10. The eye tracking system of claim 9, wherein the processing circuitry is configured to perform the steps repeatedly.

11. The eye tracking system of claim 9, wherein the processing circuitry is configured to select the pair of a first and second candidate glint, out of all possible pairs of a first candidate glint and a second candidate glint, that has the highest probability of corresponding to the predicted first and second glint positions, by:
determining a probability that the positions of the first and second candidate glint in the glint pair correspond to the predicted first and second glint positions;
determine a closeness of the glint pair to a selected part of the eye; and
selecting the glint pair from the possible glint pairs based on a result from the probability determination and the closeness determination.

12. The eye tracking system of claim 9, wherein the processing circuitry is further configured to:
if the at least one second candidate glint is identified in the second image captured by the imaging device at a third time instance, compensating for a movement of the at least one second candidate glint from the second time instance to the third time instance by applying the cornea movement filter, CMF, before updating the cornea movement filter, CMF.

13. The eye tracking system of claim 9, wherein the processing circuitry is further configured to, before updating the cornea movement filter, CMF:
compare the probability of the selected pair of candidate glints to a preset threshold value; and
if the probability of the selected pair of candidate glints exceeds the preset threshold value, setting the predicted first and second glint positions to the positions of the selected pair of candidate glints.

14. The eye tracking system of claim 9, wherein the processing circuitry is further configured to, the first time the method is performed, set a respective start value for the estimated initial 3D position and the estimated initial 3D velocity of the cornea center of the eye at the first time instance based on a respective estimated 3D position and velocity of the eye or head of the user.

15. The eye tracking system of claim 9, wherein the eye tracking system is further configured to predict a gaze of the user based on the estimated current 3D position of the cornea.

16. A non-transitory computer-readable storage medium storing instructions which, when executed by processing circuitry of an eye tracking system, cause the eye tracking system to:
generate a cornea movement filter, CMF, comprising an estimated initial 3D position and an estimated initial 3D velocity of a cornea center of an eye at a first time instance, wherein the cornea movement filter, CMF, is a Kalman filter; and
predict a first two-dimensional, 2D, glint position in an image captured at a second time instance by applying the cornea movement filter, CMF, wherein the predicted first glint position represents a position where a first glint is predicted to be generated by a first illuminator associated with the eye tracking system;
predict a second 2D glint position in the image captured at the second time instance by applying the cornea movement filter, CMF, wherein the predicted second glint position represents a position where a glint is predicted to be generated by a second illuminator associated with the eye tracking system;
perform image processing to:
identify at least one first candidate glint in a first image captured by an imaging device at the second time instance wherein the first image comprises at least part of the cornea of the eye and at least one glint generated by the first illuminator; and identify at least one second candidate glint in the first image or in a second image captured by the imaging device at a third time instance and comprising at least part of the cornea of the eye and at least one glint generated by the second illuminator;

select a pair of a first and second candidate glint, out of all possible pairs of a first candidate glint and a second candidate glint that has a highest probability of corresponding to the predicted first and second glint positions, based on a probability estimation function;

estimate a current 3D position of the cornea based on positions of the selected pair of first and second candidate glints; and update the cornea movement filter, CMF, by setting the estimated initial 3D position of the cornea center to the current 3D position of the cornea center;

determine a current estimated 3D velocity of the cornea center based on the estimated initial 3D position of the cornea center and the current 3D position of the cornea center; and set the estimated initial 3D velocity of the cornea center to the current estimated 3D velocity of the cornea center.

* * * * *